United States Patent [19]

Parker et al.

[11] Patent Number: 5,501,880
[45] Date of Patent: Mar. 26, 1996

[54] PROCESS TO PRODUCE REINFORCED TIRE CORDS WITH PLASMA TREATED FIBERS INCORPORATED INTO A RUBBER/BLOCKED ISOCYANATE COMPOSITION

[75] Inventors: Dane K. Parker, Massillon; Derek Shuttleworth, Munroe Falls, both of Ohio

[73] Assignee: The Goodyear Tire & Rubber Company, Akron, Ohio

[21] Appl. No.: 327,333

[22] Filed: Oct. 21, 1994

Related U.S. Application Data

[63] Continuation-in-part of Ser. No. 956,221, Oct. 5, 1992, abandoned.

[51] Int. Cl.$^6$ .............................. B05D 3/02; H05H 1/00
[52] U.S. Cl. ...................... 427/389.9; 427/536; 427/538; 156/910
[58] Field of Search ..................................... 427/322, 538, 427/434.6, 389.9, 393.5, 536; 156/910

[56] References Cited

U.S. PATENT DOCUMENTS

| | | | |
|---|---|---|---|
| 3,853,657 | 12/1974 | Lawton | 427/322 |
| 3,897,585 | 7/1975 | Wood | 156/910 |
| 4,328,324 | 5/1982 | Kock et al. | 156/910 |
| 4,448,813 | 5/1984 | Solomon | 427/430.1 |
| 4,462,855 | 7/1984 | Yankowsky et al. | 427/407.1 |
| 4,680,228 | 7/1987 | Sharma | 156/121 |
| 4,694,057 | 9/1987 | Smith et al. | 526/206 |
| 4,794,041 | 12/1988 | Gillberg-LaForce | 156/167 |
| 4,983,684 | 1/1991 | Weinstein et al. | 525/329.1 |
| 5,043,455 | 8/1991 | Parker et al. | 548/539 |
| 5,053,246 | 10/1991 | Shuttelworth et al. | 427/413 |
| 5,151,142 | 9/1992 | Imai et al. | 156/910 |
| 5,169,675 | 12/1992 | Bartoszek-Loza et al. | 427/536 |
| 5,283,289 | 2/1994 | Yamamoto et al. | 264/211.24 |
| 5,290,378 | 3/1994 | Kusano et al. | 156/910 |
| 5,348,772 | 9/1994 | Demuth et al. | 427/536 |
| 5,411,638 | 5/1995 | Bernard et al. | 156/910 |

*Primary Examiner*—Diana Dudash
*Attorney, Agent, or Firm*—Alvin T. Rockhill

[57] ABSTRACT

By utilizing the process of this invention, the adhesion between polymeric reinforcements and rubber compositions can be greatly improved. This invention more specifically discloses a process for preparing a rubber article containing a polymeric reinforcement which comprises: (1) plasma treating the polymeric reinforcement in a manner whereby reactive groups containing Zerewitinoff active hydrogen atoms are bonded to the surface thereof; (2) incorporating the polymeric reinforcement having Zerewitinoff active hydrogen atoms bonded to the surface thereof into an uncured rubber composition, wherein said rubber composition has pendant blocked isocyanate groups bound thereto; and (3) curing the uncured rubber into the desired shape for the rubber article at an elevated temperature sufficient to deblock the isocyanate groups bonded to the uncured rubber allowing for the isocyanate groups to react with the Zerewitinoff active hydrogen atoms bonded to the surface of the polymeric reinforcement.

20 Claims, No Drawings

PROCESS TO PRODUCE REINFORCED TIRE CORDS WITH PLASMA TREATED FIBERS INCORPORATED INTO A RUBBER/BLOCKED ISOCYANATE COMPOSITION

This is a continuation-in-part application of U.S. patent application Ser. No. 7/956,221, filed on Oct. 5, 1992 abandoned.

BACKGROUND OF THE INVENTION

Rubber articles are typically reinforced with glass, steel, or polymeric material to provide increased strength, stability and fatigue resistance. For instance, high strength polymeric cords and polymeric fabrics are generally incorporated into tires to improve the physical and performance characteristics thereof. It is also very common to use polymeric cords and fabric to reinforce other rubber articles such as hoses, conveyor belts, power transmission belts and rubber mountings.

Even though alternative materials, such as metals, can be prepared and used to reinforce rubber articles, polymeric reinforcements are used in many instances to reduce the weight of the article, for ease of manufacture, and for improved performance characteristics. Unfortunately, polymeric fiber-to-rubber adhesion tends to be poor in certain specialized systems and may be degraded during use, causing reduced performance and a shortened product life. This is particularly true in cases where polymeric reinforcements are made utilizing materials such as polyaramide fibers which exhibit particularly poor adhesion to rubber compositions.

Various methods have been utilized in the past to promote adhesion and to reduce degradation during the life of the rubber article. One such method which has been widely used commercially throughout the rubber industry involves the application of various resorcinol-formaldehyde-latex (RFL) coatings to the surface of the polymeric reinforcement. Treating the polymeric reinforcement in preparation for RFL dipping treatment, and the RFL treatment itself, involves a complicated sequence of time consuming and consequently expensive steps. U.S. Pat. No. 5,053,246 to Shuttleworth discloses a technique for treating the surfaces of rubber-reinforcing materials with a gas plasma of oxygen and carbon tetrafluoride to activate its surface making it more receptive to adhesive. The method disclosed by Shuttleworth comprises the sequential steps of (1) treating the surface of a polymer in a plasma chamber containing a mixture of oxygen ($O_2$) and tetrafluoromethane ($CF_4$) at a pressure of about 0.001 to 1 Torr. in a plasma generated by electrical energy of about 50 Hz to 2.45 GHz; and (2) further treating the polymer with a plasma of an incorporating gas, such as an air/water mixture, generated by electrical energy. In a preferred embodiment, the polymer is in the form of a filament, tow, cord, woven fabric or fiber. The plasma treatment removes hydrogen bonded species and other weakly bonded species, such as sulfates, carbonates, low molecular weight polymer, and processing aids, etc. from chemically reactive sites on the polymer surface, making those sites available for chemical bonding. The chemically reactive sites may then be exposed to other species, such as an RFL adhesive.

Elastomers can be crosslinked by a number of techniques as described by A. Coran in "Science and Technology of Rubber" Chapter 7. Most elastomers are cured using sulfur or peroxide vulcanization although curatives such as phenolic resins, quinone derivatives, maleimide derivatives and metal oxides can also be employed in the crosslinking reaction.

A novel crosslinking reaction was reported in Kautschuk Gummi Kunststoffe 8/83 which discloses a cure system consisting of the adduct of a diisocyanate with nitrosophenol. In this cure system, the nitrosophenol is released at cure temperature and reacts with the elastomer. Crosslinking occurs when the diisocyanate reacts with functionality on the polymer bond nitrosophenol. This blocked isocyanate curative is incorporated in a step separate from the polymerization.

Polymer bound isocyanates have been used as part of a curing package of acrylate polymers. European Patent Application Publication No. 130,322 discloses that acrylate polymers containing m-isopropenyl $\alpha$, $\alpha$-dimethyl benzyl-isocyanate (TMI) can be cured and that the polymers can be used in coating applications. U.S. Pat. No. 4,694,057 discloses that elastomers containing small amounts of 1-(1-isocyanato-1-methylethyl) -3-(l-methylethenyl)-benzene (TMI) can be crosslinked by utilizing difunctional or polyfunctional active hydrogen compounds. For instance, U.S. Pat. No. 4,694,057 discloses that elastomers which are difficult to cure with sulfur or sulfur containing compounds, such as polychloroprene, can be cured utilizing such a technique.

U.S. Pat. No. 4,983,684 and U.S. Pat. No. 5,043,455 disclose a technique for curing rubber compositions which does not rely upon sulfur or sulfur containing compounds. The cure systems disclosed by these patents rely upon the reaction between a blocked isocyanate group and an active Zerewitinoff hydrogen atom. The utilization of this process accordingly results in a urethane or urea type cure. One benefit realized by utilizing this process is that premature crosslinking of the elastomer is generally not a significant problem if the appropriate blocking group is used.

U.S. Pat. No. 4,983,684 and U.S. Pat. 5,043,455 more specifically disclose a rubber composition which can be crosslinked by heating which is comprised of (1) at least one rubber having pendant blocked isocyanate groups bound thereto; and (2) at least one compound which contains at least 2 Zerewitinoff active hydrogens.

SUMMARY OF THE INVENTION

The present invention relates to a process for improving the adhesion between polymeric reinforcements and the rubber in rubber articles which they are reinforcing. This improvement in adhesion is attained by increasing the level of interfacial bonding between the reinforcements and the rubber formulation employed in the article. This technique is applicable to virtually any type of polymeric reinforcement, but is particularly beneficial when used in conjunction with polymeric reinforcements which display particularly poor adhesion to rubber compounds, such as polyaramides.

By utilizing the technique of this invention, polymeric reinforcements such as cords, fabrics, and short fibers, can be strongly adhered to rubbers via covalent bonding. This technique can be implemented in manufacturing a wide variety of reinforced rubber products including tires, hoses, conveyor belts and power transmission belts.

The subject invention more specifically reveals a process for preparing a rubber article containing a polymeric reinforcement which comprises: (1) plasma treating the reinforcing element in a manner whereby reactive groups having at least one Zerewitinoff active hydrogen atoms are bonded to the surface thereof; (2) incorporating the polymeric reinforcing element having Zerewitinoff active hydrogen atoms bonded to the surface thereof into an uncured rubber composition, wherein said rubber composition has pendant blocked isocyanate groups bound thereto; and (3) curing the uncured rubber into the desired shape for the rubber article at an elevated temperature sufficient to deblock the isocyanate groups bonded to the uncured rubber allowing for the isocyanate groups to react with the Zerewitinoff active hydrogen atoms bonded to the surface of the polymeric reinforcement.

DETAILED DESCRIPTION OF THE INVENTION

The techniques of this invention can be utilized to improve the adhesion between virtually any type of polymeric reinforcement and the rubber in the article being reinforced. For instance, the polymeric reinforcement can be in the form of a filament, a tow, a cord, a woven fabric or a short fiber. The process of this invention is also applicable to polymeric reinforcements which are made of virtually any type of polymeric material which is suitable for reinforcing rubber products. Some representative examples of suitable polymeric materials include nylons, polyesters, polyethylene, polypropylene, polyureas, polyamides, polyvinyl alcohol, polyphenylene sulfides, polyaramides (for example Kevlar™), liquid crystalline polymers, treated cellulose (rayon) and the like. The polymeric reinforcements employed in practicing this invention will typically be nylon (polyamides), polyesters (such as polyethylene terephthalate), or polyaramides.

The process of this invention can be used in manufacturing virtually any type of rubber article which is reinforced with a polymeric reinforcement. However, this process is of particular value when used in conjunction with the manufacture of tubeless pneumatic tires, such as tires for automobiles trucks, aircraft and heavy equipment.

The first step in the process of this invention involves plasma treating the polymeric reinforcement in a manner whereby reactive groups containing Zerewitinoff active hydrogen atoms are bonded to the surface of the polymeric reinforcement. The reactive group containing a Zerewitinoff active hydrogen which is attached to the surface of the reinforcement will typically be selected from the group consisting of carboxyl groups, hydroxyl groups, amines, hydroperoxides and mercaptans. The reactive group will most typically be a hydroxyl group. The reactive group containing Zerewitinoff active hydrogen atoms are applied to the surface of the polymeric reinforcement by plasma treatment in a standard plasma chamber. The plasma is an ionized gas which contains an essentially equal density of positive and negative charges. The plasma can exist over a wide range of temperature and pressure. However, in the practice of this invention, low-pressure plasmas will be utilized at a pressure which is typically within the range of about 0.01 Torr to 1 Torr (13 Pa to 133 Pa).

The equipment used in carrying out the plasma treatment will typically consist of a vacuum system, a power supply, a matching network, a reactor center, and a controller as described in The Science and Technology of Adhesive Bonding, Edited By L. H. Sharpe and S. E. Wentworth (199), pages 301–320 in a chapter titled, "Plasma Treatment for Improved Bonding: A Review", authored by E. M. Liston. The vacuum system maintains the desired lower pressure and allows for a continuous flow of the desired gas into the reactor. The gas utilized in the plasma treatment will typically be ammonia, nitrogen, nitrous oxide, nitrogen oxide, nitrogen dioxide, oxygen, or a air/water system. In practicing this invention, the air/water system has proven to be most beneficial. The vacuum system must be capable of maintaining the desired pressure/flow regime. However, the moderate vacuum level needed does not require sophisticated pumps. For instance, 2-stage mechanical pumps are satisfactory. The pump package is usually sized to allow pump down in less than one minute and to maintain an inlet gas flow of 50 cc/minute to 1,000 cc/minute, depending upon the size of the reactor.

A power supply can be utilized to furnish the electrical power necessary to generate the plasma. The power required ranges from 50 watts to 5,000 watts, depending upon the size of the reactor. Large commercial scale reactors are typically cooled with water or air.

Plasma reactors can be built to utilize a wide range of frequencies, from DC to microwave. DC plasmas are difficult to use because they require a current limiting resistor to prevent arc formation. This resistor must be changed for each different gas and operating condition. Also, ion bombardment becomes a significant factor in DC plasmas.

Low frequency plasma (50 Hz to 500 KHz) is sometimes used because the generators are somewhat less expensive and because they do not require precise impedance matching. However, studies of low frequency have shown that the plasma extinguishes each half cycle and that the reaction rates are significantly slower than at radio frequencies.

Radio frequency plasmas (13.56 MHz—an FCC assigned frequency) are easily generated with equipment that is stable and reliable and has been commercially available for many years. At this frequency, it is necessary to use an impedance matching network to match the impedance of the plasma to the output impedance of the generator (usually 50 ohms, resistive). These can be tuned either manually or automatically with servo-driven devices. At 13.56 MHz the plasma is very stable and reactive because the quench time of the plasma species is much longer than the time between half-cycles of the excitation.

Microwave plasma (2450 MHz) may be even more reactive than RF plasma, but there is still some dispute over this. The microwave generator is generally less expensive than RF generators. However, if the cost of the peripheral equipment such as wave guides, power meters, dummy load, circulator, stub tuners, and applicator is included, the total system cost appears to be about the same as an RF system. The decision between RF and microwave will probably hinge on process considerations and on the availability of an applicator that is tolerant of large impedance variations in the plasma.

The plasma equipment used will also typically include an impedance matching network. The impedance matching network is usually an adjustable transformer of a manual, or servo-driven, pi-network that transforms the impedance of the plasma to the required output impedance of the generator. A match is necessary to prevent excessive reflected power from damaging the generator, and to know how much power is being dissipated in the plasma. The impedance of a plasma can vary from a few ohms to several thousand ohms and can be very reactive, depending on the gas, reactor design, and the operating conditions. The use of a matching network makes it possible to use one plasma system with many different gases and operating conditions.

Plasma systems usually include two power meters, one to show the power towards the reactor (the "forward" power)

and the other to show the power being reflected back towards the generator by an impedance mismatch (the "reflected" power). When there is proper impedance match, the reflected power is <1% of the forward power and all the electrical energy is being absorbed by the plasma.

A recurring problem in specifying plasma processes, or in transferring a plasma process from one type or size of reactor to another, is in defining the "power density". This can be defined in at least three ways: (1) watts per unit area of electrode or shelf, (2) watts per unit volume of primary plasma or, (3) watts per unit volume of the entire reactor. Each of these is deficient in some way. Therefore, it is usually not possible to predict the best process parameters for transferring a process from one reactor to another. It is necessary to start with a reasonable set of parameters and to optimize the process experimentally in the new reactor.

The reactor center is the "heart" of the plasma system. It is a pressure vessel designed to support the pressure/flow conditions of the plasma, couple the electrical energy into the plasma, and contain the material for processing. Aluminum is the metal of choice for the reactor center. It has excellent thermal and electrical conductivity and it is not readily attacked by any plasma except the heavy halogens (Cl, Br, I). Aluminum can be fabricated into cylindrical reactors (known as "barrel" reactors) and into rectangular reactors with shelf or cage electrodes. The only size limitations on metal reactors is the practicality of fabricating large vacuum vessels. Stainless steel should be avoided in plasma reactors.

Most commercially available plasma systems are designed for batch operation. That is, they are designed to be loaded with a batch of parts (polymeric reinforcement), evacuated, plasma treated and purged to atmospheric pressure with the parts then being removed. Reactor centers (plasma chambers) designed for continuous processing of polymeric cord, filaments and fabric can be designed. These can be cassette-to-cassette or air-to-air.

In cassette-to-cassette systems the source and takeup spools are both in the vacuum chamber. This is the typical configuration in the vacuum-deposition coating industry where very low pressures are necessary to get good coating.

In air-to-air systems there are several sequentially pumped chambers on either side of the reactor chamber, which are connected by some form of "die". These make it possible to bring material continuously from atmospheric pressure to reactor pressure, and back to atmospheric pressure. In this type of system the major engineering problem is the design of these dies.

In both types of continuous systems the maximum processing speed ("line speed") is determined by the required residence time in the plasma to get the proper treatment. The present data show that, for reasonable power densities and existing equipment, clean polymers (e.g. polyethylene, polyimide, and polyamide) can be treated in <10 seconds residence time. This gives a line speed of 500 ft./min. or more.

The equipment used to plasma treat the polymeric reinforcement will typically include a system controller. It controls all the process variables: type of gas, pressure, gas flow rate, power level, and processing time. It may be as simple as discrete relays, timers, and needle valves or it might be a microprocessor based system with sophisticated displays, fully automated process control, multiprocess capabilities, and data-output, and alarm systems.

The equipment employed in this invention used a quartz barrel reactor center with capacitive coupling of the RF plasma. Gas flows were controlled with electronic mass flow controllers, pressure monitored by a capacitance manometer and controlled via a servo-throttle valve.

The gas utilized in the plasma treatment procedure dictates the type of reactive groups which are bonded to the surface of the polymeric reinforcement. For instance, the utilization of ammonia as the gas in the plasma treatment results in the grafting of amino groups to the surface of the polymeric reinforcement. In cases where a air/water system is used in the plasma treatment, the reactive groups bonded to the surface of the polymeric reinforcement are predominantly hydroxyl groups. In any case, it is only important for the reactive groups bonded to the polymeric reinforcement via the plasma treatment procedure to contain at least one Zerewitinoff active hydrogen atom.

After the polymeric reinforcement is plasma treated, it can be built into the rubber article using standard techniques. For example, a tire cord which has been plasma treated can be built into a tire utilizing standard tire building procedures. However, the rubber composition utilized in building the rubber article will contain pendant blocked isocyanate groups. It is not necessary for the entire rubber article to be comprised of such rubbers which contain pendant blocked isocyanate groups, but it is important for the rubber which is in contact with the reinforcing element to contain such pendant blocked isocyanate groups.

The rubbers which are used in the practice of this invention contain moieties possessing pendant blocked isocyanate groups which are covalently bonded to the backbone of the rubber. These moieties possessing pendant blocked isocyanate groups have the structural formula:

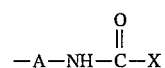

wherein A represents an alkylene group, an arylene group or an alkarylene group and wherein X represents the blocking agent. For example, a highly preferred moiety containing pendant blocked isocyanate groups has the structural formula:

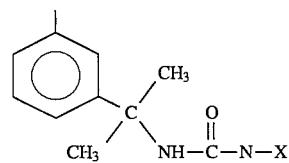

wherein X represents the blocking agent.

Rubbers having pendant blocked isocyanate groups bound thereto can be prepared utilizing a wide variety of techniques. For instance, U.S. Pat. No. 4,429,096 discloses a process wherein the isocyanate group on meta-TMI is blocked with a cationic carbamic structure and then polymerized into a polymer. The technique disclosed in U.S. Pat. No. 4,429,096 is highly suitable for preparing rubbers having pendant blocked isocyanate groups which can be utilized in accordance with the process of this invention. U.S. Pat. No. 4,604,439 also discloses a technique for incorporating blocked TMI into polymers utilizing emulsion polymerization. The teachings of U.S. Pat. No. 4,429,096 and U.S. Pat. No. 4,604,439 are incorporated herein by reference in their entirety. U.S. Pat. No. 4,694,057 discloses a technique for polymerizing unblocked TMI into rubbers utilizing an emulsion polymerization technique. Such rubbers containing unblocked TMI can be blocked by reacting the rubber containing unblocked TMI with an appropriate blocking agent. In fact, any rubber containing pendant unblocked isocyanate groups can be blocked by reacting the unblocked isocyanate groups thereon with an appropriate blocking agent.

A wide variety of compounds can be utilized to block isocyanate groups in accordance with the process of this invention. Some representative examples of suitable compounds for utilization as blocking agents include phenols, oximes, caprolactam, pyrrolidinone, mercaptans and β-keto esters. Blocking agents which can be utilized are discussed in greater detail in Z. Wicks, Journal of Coatings Technology, *"Progress in Organic Coatings"*, Vol. 5, page 73 (1975) and Z. Wicks, Journal of Coatings Technology, *"Progress in Organic Coatings"*, Vol. 9, page 3 (1981), which are incorporated herein by reference in their entirety.

The blocking agents which are preferred for utilization in the process of this invention include alcohols, cyclic amides, ketoximes, phenols, and secondary amines. The cyclic amides which can be utilized typically have the structural formula:

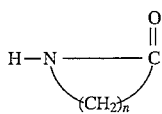

wherein n is an integer from 2 to about 10. It is normally preferred for n to be an integer from 3 to 5. Caprolactam which has the structural formula:

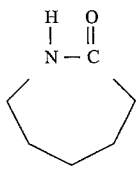

and a deblocking temperature which is within the range of about 110° C. to about 140° C. and 2-pyrrolidinone which has the structural formula:

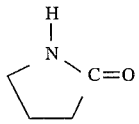

and a deblocking temperature which is within the range of about 160° C. to about 190° C. are highly preferred blocking agents.

The ketoximes which can be utilized as blocking agents typically have the structural formula:

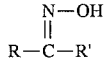

wherein R represents an alkyl group containing from 1 to 10 carbon atoms and wherein R' represents a hydrogen atom or an alkyl group containing from 1 to 10 carbon atoms. Phenol and substituted phenols can also be utilized as the blocking agent. The secondary amines which can be utilized as blocking agents typically have the structural formula:

wherein R represents an aryl group and wherein R' represents an aryl or an alkyl group.

A rubber having pendant blocked isocyanate groups bound thereto wherein 2-pyrrolidinone is utilized as the blocking agent is depicted as follows:

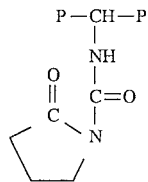

wherein P represents polymer chains of the rubber. 2-pyrrolidinone is a particularly valuable blocking agent because it has a deblocking temperature which is within the range of about 160° C. to about 190° C. When the blocked isocyanate is heated to the deblocking temperature, the blocking group is released exposing the free isocyanate. The free isocyanate then undergoes the curing reaction. In cases where the isocyanate is not blocked, premature crosslinking reactions occur making processing of the elastomer difficult if not impossible. Different blocking groups can be employed depending on what processing and curing temperatures are desired. If the rubber is processed at temperatures higher than the deblocking temperature, premature crosslinking or scorch of the rubber will occur. The higher the deblocking temperature is, the more latitude there is in processing of the rubber but cure temperatures must, of course, be higher in order for deblocking and subsequent crosslinking to occur. As the deblocking temperature is lowered, the rubber must be processed more gently but can be effectively cured at a lower temperature. Thus, the deblocking group can be chosen to give the optimal mix of scorch safety and cure temperature. The deblocking temperature of 2-pyrrolidinone has been found to be very good in some applications. The deblocking temperature of caprolactam is somewhat lower but can also be used effectively as a blocking agent in curing some rubber compounds.

Tetrahydro-N-[1-methyl-1-[3-(1-methylethenyl) phenyl] ethyl]-2-oxo-1-H-pyrrolo-1-carboxamide (TOPC) has the structural formula:

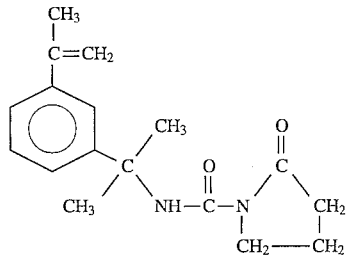

and is an excellent choice as a monomer having pendant blocked isocyanate groups which can be polymerized into rubbers. TOPC is a solid at room temperature and is readily soluble in most monomers commonly used in making synthetic rubber, such as styrene, acrylonitrile, 1,3-butadiene, isoprene, acrylates, vinylidene chloride, and the like. It will also readily polymerize by either solution or emulsion free radical means under a wide variety of conditions with varying initiator systems, such as azo compounds, peroxides, persulfates and redox systems. Additionally, TOPC will not retard normal polymerization rates. The synthesis of TOPC is disclosed in U.S. Pat. 5,043,455 and the teachings of U.S. Pat. 5,043,455 are incorporated herein by reference in their entirety.

Rubbers having pendant blocked isocyanate groups which are made with TOPC do not deblock at temperatures below about 160° C. Rubbers made with TOPC can also be coagulated by utilizing standard procedures.

Rubbers which are made utilizing TOPC as a comonomer have units which are derived from TOPC incorporated therein. These repeat units which are derived from TOPC have the following structure:

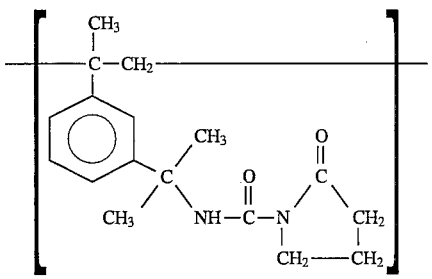

and can be distributed throughout the polymer chains of the rubber in an essentially random manner. Such rubbers will also typically contain repeat units which are derived from conjugated diene monomers, such as isoprene or 1,3-butadiene and can be deblocked by simply heating to temperatures above about 160° C. In some applications it is advantageous to hydrogenate the rubber. For instance, worthwhile benefits can be achieved in cases where at least about 80% of the residual double bonds in the rubber have been hydrogenated. In most cases where hydrogenation is empolyed, at least about 90% of the double bonds in the rubber will be hydrogenated. The deblocking reaction is very fast at temperatures within the range of about 180° C. to about 200° C. As a result of the deblocking reaction, repeat units having the structural formula:

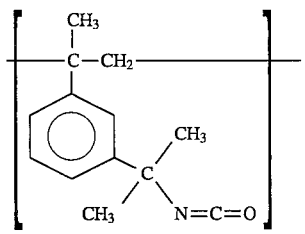

which contain unblocked isocyanate groups are formed and 2-pyrrolidinone (2-pyrrolidone) is liberated. The 2-pyrrolidinone is believed to be relatively non-toxic and has a boiling point of 245° C.

TOPC monomer can be synthesized by the reaction of TMI with 2-pyrrolidinone. This reaction can be carried out over a very wide temperature range with temperatures within the range of about 80° C. to 150° C. being typical. It is generally preferred for this reaction to be conducted at a temperature within the range of 90° C. to 120° C. with temperatures in the range of 95° C. to 110° C. being most preferred. In this reaction one mole of TMI reacts with one mole of 2-pyrrolidinone to produce one mole of TOPC. It is normally preferred for a slight excess of 2-pyrrolidinone to be utilized in the reaction. For example, it is advantageous to employ the 2-pyrrolidinone in an excess of about 2 to about 5 mole percent. The reaction product can be mixed into an aliphatic liquid hydrocarbon to induce crystallization of the TOPC. The aliphatic liquid hydrocarbon will normally be an alkane containing from 5 to 10 carbon atoms, such as hexane, pentane, or octane. The ratio of the aliphatic hydrocarbon employed to the reaction product will normally be from 2:1 to 10:1 by volume and will preferably be from 3:1 to 5:1 by volume.

Zerewitinoff active hydrogen is reactive as determined by the Zerewitinoff method as described in the Journal of the American Chemical Society, Vol. 49, page 3181 (1927). The Zerewitinoff active hydrogen will typically be present in a hydroxyl group, amine group, carboxyl group or thiol group. Zerewitinoff hydrogens which are present in hydroxyl groups are the most highly preferred. Zerewitinoff hydrogen atoms which are present in amine groups are also very good.

In the final step of the process of this invention, the uncured rubber containing pendant blocked isocyanate groups is cured at an elevated temperature at which the isocyanate groups on the uncured rubber deblock and react with the Zerewitinoff active hydrogen atoms bonded to the surface of the polymeric reinforcement. The blocking agent, represented as X is removed from the isocyanate group by the action of heat as follows:

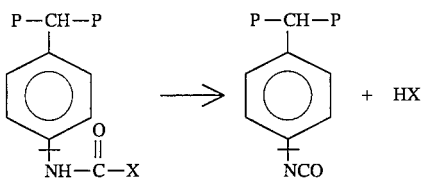

wherein P represents polymer chains of the rubber. After the blocking agent is removed, the free isocyanate groups on the rubber react with the Zerewitinoff active hydrogen atom containing groups (e.g.—OH groups) on the surface of the polymeric reinforcement as follows:

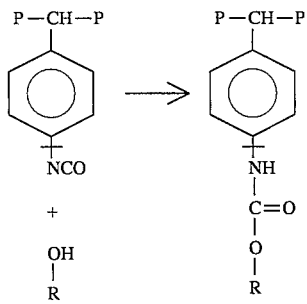

wherein R represents the polymeric reinforcement.

Catalysts can be utilized in order to accelerate the reaction between the Zerewitinoff active hydrogen and isocyanate groups. Such catalysts are of particular importance in cases where the blocking agent has a very high deblocking temperature. For instance, the utilization of such catalysts is of particular value in cases where 2-pyrrolidinone is utilized as the blocking agent. Catalysts capable of speeding up both the deblocking reaction and the reaction of the free isocyanate groups with the Zerewitinoff active hydrogen can be utilized. For example, tin salts, bismuth compounds, mercury compounds, tertiary amines, iron acetyl acetonate, cobalt acetyl acetonate and nickel acetyl acetonate can be utilized as the catalyst. Tin salts such as dibutyltin dilaurate, dimethyltin dilaurate, dibutyltin diacetate, and dimethyltin diacetate are most preferred. Dialkyltin sulfides are also highly preferred catalysts.

The rubber compositions of this invention will typically contain from about 0.001 moles to about 0.4 moles of blocked isocyanate groups per 100 grams of polymer. The rubber compositions of this invention will preferably contain from about 0,005 moles to about 0.1 moles of blocked isocyanate groups per 100 grams of polymer. Such rubber compositions will more preferably contain from about 0.01 to about 0.03 moles of blocked isocyanate groups per 100 grams of rubber. The molar ratio of Zerewitinoff active hydrogen atoms on the surface of the polymeric reinforcement to blocked isocyanate groups will typically be at least about 0.5:1. The molar ratio of Zerewitinoff active hydrogen atoms to blocked isocyanate groups will more typically be within the range of about 0.6:1 to about 2:1. The ratio of Zerewitinoff active hydrogen atoms to blocked isocyanate groups will preferably be within the range of about 0.7:1 to about 1.4:1. More preferably, the ratio of Zerewitinoff active hydrogen atoms to blocked isocyanate groups will be within the range of about 0.8:1 to about 1.2:1. However, it should be noted that a very substantial excess of Zerewitinoff active hydrogen atoms over the amount of blocked isocyanate groups present typically is not detrimental.

In general, the elastomer rubber containing blocked isocyanate groups can be compounded using classical rubber compounding technology such as given by Long in his book "Basic Compounding and Processing of Rubber". In typical rubber formulations, sulfur, and at least one accelerator is commonly used to affect the cure. To activate the sulfur, zinc oxide and stearic acid are usually employed. The sulfurless cure systems described in U.S. Pat. No. 5,043,455 can also be utilized in curing the rubber compositions in the final step of the process of this invention. However, regardless of the cure system used, the temperature used to cure the rubber must be sufficient to deblock the isocyanate groups bonded to the uncured rubber. This will typically be within the range of about 140° C. to about 250° C. The temperature used to cure the rubber will more typically be within the range of about 160° C. to about 220° C. It is generally more preferred to cure the rubber at a temperature which is within the range of about 180° C. to about 210° C.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLES 1–6

In this series of experiments, polyaramide pulp was plasma treated utilizing five different procedures and was then blended into a nitrile rubber containing pendant blocked isocyanate groups. The samples were then cured and evaluated for physical characteristics. The nitrile rubber (NBR) utilized in this series of experiments was prepared utilizing an emulsion polymerization procedure. In the procedure used, a polymerization medium was prepared by mixing 66 parts of 1,3-butadiene, 24.2 parts of acrylonitrile, 5.9 parts of tetrahydro-N-(1-methyl-1-(3-(1-methylethenyl)phenyl)ethyl)-2-oxy-1H-pyrrolo-1-carboxamide, 2.5 parts of hydroxypropyl methacrylate, 1.4 parts of N-(4-anilinophenyl)methacrylamide, 198.5 parts of deionized water, 2.5 parts of potassium fatty acid soap, 0.5 parts of t-dodecanethiol, 0.2 part of trisodium phosphate, 0.09 parts of p-menthane hydroperoxide, 0.003 parts of ferrous sulfate heptahydrate, 0.021 parts of sulfuric acid, 0.018 parts of tetrasodium salt of ethylenediamide tetraacetic acid, and 0.03 parts of sodium formaldehyde sulfoxylate. The monomers in the polymerization medium were allowed to polymerize at 65° C. until a conversion of 75% was attained. The latex produced was coagulated with a warm, dilute aqueous aluminum sulfate solution. The nitrile rubber crumb recovered was dried at 75° C. The nitrile rubber made was determined to have a Mooney ML-4 viscosity of 42.

The aramide pulp utilized in this experiment was plasma treated in a batch process using a Branson IPC BPS 2000 unit.

Modified pulps were prepared by spreading approximately 50 grams of the pulp evenly over a stainless steel tray fitted with a mesh bottom to allow gas circulation. Up to 4 trays can be treated at a time according to the methods outlined below. The Kevlar™ aramide pulp was used as received from E. I. du Pont de Nemours & Company except in Example 6. In the case of Example 6, the pulp was ground with dry-ice in a Thomas grinder to "open-up" the pulp structure and reduce flocculation when spreading the pulp on the treatment trays. As the data below indicate this pretreatment had no positive impact on the final rubber properties.

Treatment trays were inserted in the Branson IPC BPS 2000 reactor and the vacuum chamber pumped out to a base pressure of about 0.01 Torr. Reactive gas was introduced at a flow rate of 20 sccm and system pressure adjusted to 0.5 Torr. The gas plasma was initiated at a RF-power of 300W for the time intervals listed in the table below. The air/water mixture was obtained by passing the supply air through a water bubbler and sequential treatments were performed as listed in Table I.

TABLE I

| | Plasma Treatment Conditions | |
|---|---|---|
| Example | Gas (Composition) | Time Exposure (mins.) |
| 1 | None | — |
| 2 | $CF_4/O_2$ (20%/80%) | 10 |
| 3 | Air/Water | 10 |
| 4 | $NH_3$ | 10 |
| 5 Step 1 | $CF_4/O_2$ (20%/80%) | 5 |
| 5 Step 2 | $NH_3$ | 10 |
| 6[(a)] | $NH_3$ | 10 |

[(a)]Pulp preground as described above.

After treatment, the plasma treated samples were sealed in food-grade pouches before use in NBR blends.

The blends made in Examples 1–6 were prepared by suspending the Kevlar™ aramide pulp (9 parts with respect to rubber) with vigorous agitation in a dilute, warm (60° C.) aqueous aluminum sulfate solution (2.5 weight percent aluminum sulfate based on rubber). To this vigorously agitated mixture, was slowly added the NBR latex. A small amount of a polyamine coagulation aid (Perchem™ 503) was added as required to clear the serum. The rubber appears to coat aggregates of Kevlar™ in a uniform manner giving composite coagulum particles about 5 mm in length. These particles were filtered, washed with water and dried in an air oven at 70° C. before being compounded with 10 parts of dioctyl phthalate, and 0.35 parts of dialkyltin sulfide. All of the blends were single pass mixed in a small (about 60 cm³) Brabender mixer for 5 minutes at 70 rpm. The mixed compounds were then all cured for 35 minutes at 190° C. as standard 0.075 inch (1.9 mm) thick test sheets.

After curing, the tensile and elongation values of the compounds were determined and are shown in Table II.

TABLE II

| Example | Peak Tensile* | Elongation at Peak | Tensile at Break | Elongation at Break* |
|---------|---------------|--------------------|--------------------|----------------------|
| 1 (Control) | 570 psi<br>3.93 × 10⁶ Pa | 128% | 570 psi<br>3.93 × 10⁶ Pa | 128% |
| 2 | 668 psi<br>4.61 × 10⁶ Pa | 86% | 668 psi<br>4.61 × 10⁶ Pa | 86% |
| 3 | 784 psi<br>5.41 × 10⁶ Pa | 42% | 784 psi<br>5.41 × 10⁶ Pa | 50% |
| 4 | 715 psi<br>4.93 × 10⁶ Pa | 61% | 715 psi<br>4.93 × 10⁶ Pa | 61% |
| 5 | 711 psi<br>4.90 × 10⁶ Pa | 64% | 711 psi<br>4.90 × 10⁶ Pa | 68% |
| 6 | 676 psi<br>4.66 × 10⁶ Pa | 95% | 676 psi<br>4.66 × 10⁶ Pa | 95% |

*psi = pound-force/inch$_2$
Pa = pascal

The tensile strength attained in Example 3 was over 37% greater than the tensile strength measured in the control. The tensile strength measured in Example 4 was over 25% greater than the tensile strength of the control.

It is obvious that all the plasma treated Kevlar™ compounds, regardless of the specific treatment, show improved tensile and decreased elongations relative to the control (Example 1) e This is what would be expected if adhesion between the fiber and rubber were improved. Since it is known that the reactive rubber will crosslink (cure) by the reaction of unblocked polymer-bound isocyanate with polymer-bound hydroxyl groups to form urethane bonds (see U.S. Pat. No. 4,983,684), it is most probable that a portion of the bound isocyanate that lies in proximity to the plasma-treated Kevlar™ aramide surface reacts with the introduced fiber surface functional groups to form covalent interfacial bonds. Support for this scenario, was also obtained by Examples 1 and 3; compounds with the lowest and highest tensile values respectively. What was observed was clean pull-out of the Kevlar™ fibers in the control compound (Example 1) from the rubber matrix with no rubber coverage on the fibers at all. In contrast to this, the fibers in the compound of Example 3 actually broke and were much shorter than the control sample. Furthermore, the fiber surfaces were covered with rubber indicating strong adhesion.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a rubber article containing a polymeric reinforcement which consists essentially of the steps of: (1) plasma treating the polymeric reinforcement in a manner whereby reactive groups containing Zerewitinoff active hydrogen atoms are bonded to the surface thereof; (2) incorporating the polymeric reinforcement having Zerewitinoff active hydrogen atoms bonded to the surface thereof into an uncured rubber composition, wherein said rubber composition has pendant blocked isocyanate groups bound thereto; and (3) curing the uncured rubber with sulfur into a desired shape for the rubber article at an elevated temperature sufficient to deblock the isocyanate groups bonded to the uncured rubber allowing for the isocyanate groups to react with the Zerewitinoff active hydrogen atoms bonded to the surface of the polymeric reinforcement, wherein said elevated temperature is a temperature which is within the range of about 140° C. to about 250° C.

2. A process as specified in claim 1 wherein the pendant blocked isocyanate groups are covalently bonded to the backbone of the rubber and are present in moieties have the structural formula:

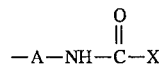

wherein A represents an alkylene group, an arylene group or an alkarylene group and wherein X represents a blocking agent.

3. A process as specified in claim 2 wherein the pendant blocked isocyanate groups are present in moieties having the structural formula:

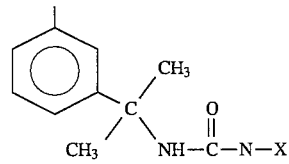

wherein X represents the blocking agent.

4. A process as specified in claim 2 wherein the pendant blocked isocyanate groups are present in moieties having the structural formula:

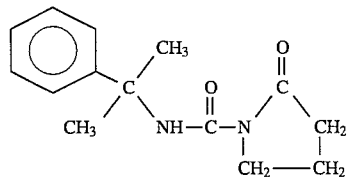

and wherein said moieties are distributed throughout the polymer chains of the rubber in a random manner.

5. A process as specified in claim 2 wherein the polymeric reinforcement is in the form of a tire cord.

6. A process as specified in claim 5 wherein the tire cord is a polyester tire cord.

7. A process as specified in claim 5 wherein the tire cord is a nylon tire cord.

8. A process as specified in claim 2 wherein the polymeric reinforcement is a polymeric fabric.

9. A process as specified in claim 2 wherein the reactive groups containing Zerewitinoff active hydrogen atoms are selected from the group consisting of carboxyl groups, hydroxyl groups, amines, hydroperoxides, and mercaptans.

10. A process as specified in claim 2 wherein the reactive groups bonded to the polymeric reinforcement are hydroxyl groups.

11. A process as specified in claim 1 wherein the rubber article is a tire.

12. A process as specified in claim 1 wherein the rubber article is a hose.

13. A process as specified in claim 1 wherein the rubber article is a belt.

14. A process as specified in claim 1 wherein the rubber containing blocked isocyanate groups is comprised of repeat units which are derived from at least one conjugated diene monomer and tetrahydro-N-[1-methyl- 1-[3-(1-methylethenyl)phenyl]ethyl]-2-oxo-1-H-pyrrolo- 1-carboxamide monomer.

15. A process as specified in claim 1 wherein the pendant blocked isocyanate groups bound to the rubber composition occur in repeat units which have the structural formula:

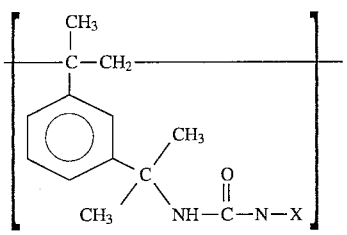

wherein X represents a blocking agent selected from the group consisting of alcohols, cyclic amides, ketoximes, phenols, and secondary amines.

16. A process as specified in claim 15 wherein the blocking agent is selected from the group consisting of caprolactam and 2-pyrrolidinone.

17. A process as specified in claim 16 wherein the rubber having pendant blocked isocyanate groups bound thereto has from about 0.005 to about 0.1 moles of blocked isocyanate groups per hundred grams of total weight.

18. A process as specified in claim 17 wherein the molar ratio of Zerewitinoff active hydrogen containing groups in the polymeric reinforcement to blocked isocyanate groups in the rubber composition is within the range of about 0.6:1 to about 2:1.

19. A process as specified in claim 15 wherein the blocking agent is selected from the group consisting of a cyclic amide.

20. A process as specified in claim 4 wherein the elevated temperature is a temperature which is within the range of about 160° C. to about 220° C.

* * * * *